United States Patent [19]

Nachbur et al.

[11] 3,754,981

[45] Aug. 28, 1973

[54] PROCESS FOR FLAMEPROOFING CELLULOSE-CONTAINING FIBRE MATERIAL

[75] Inventors: Hermann Nachbur, Dornach; Helmut Huber-Emden, Basel; Joerg Kern, Oberwil, Basel-land; Arthur Maeder, Therwil, all of Switzerland

[73] Assignee: Ciba-Geigy AG, Basel, Switzerland

[22] Filed: June 9, 1971

[21] Appl. No.: 151,529

[30] Foreign Application Priority Data
June 11, 1970 Switzerland.......................... 8807/70

[52] U.S. Cl.............. 117/136, 117/143 A, 117/145, 250/8.1
[51] Int. Cl........................ C09k 3/28, D06m 13/32
[58] Field of Search................ 117/136, 143 A, 145; 252/8.1

[56] References Cited
UNITED STATES PATENTS 3,577,270   5/1971   Guth et al........................... 117/136
3,300,274   1/1967   Pittman et al. ............... 117/135.5 X
3,671,611   6/1972   Nachbur et al.................. 252/8.1 X
3,658,952   4/1972   Nachbur et al.................. 117/143 X
3,639,539   2/1972   Nachbur et al.................. 252/8.1 X
3,634,422   1/1972   Nachbur et al.................. 252/8.1 X
3,627,767   12/1971  Nachbur et al.................. 252/8.1 X
3,679,778   7/1972   Nachbur et al.................. 117/136 X
3,669,725   6/1972   Nachbur et al...................... 117/136
2,867,597   1/1959   Costello et al.................. 117/136 X Primary Examiner—William D. Martin
Assistant Examiner—Harry J. Gwinnell
Attorney—Harry Goldsmith, Joseph G. Kolodny and Mario A. Monaco

[57] ABSTRACT

A process for the flame-proofing of cellulose-containing fibrous materials by applying to the substrates aqueous preparations containing a self-condensation product of an N-methylolamide of a dialkyl, dihalogenalkyl or dialkenyl phosphonopropionic acid advantageously together with a curable aminoplast precondensate.

9 Claims, No Drawings

PROCESS FOR FLAMEPROOFING CELLULOSE-CONTAINING FIBRE MATERIAL

The subject of the invention is a process for flameproofing cellulose-containing fibre material, characterised in that this material is treated with an aqueous preparation which contains at least one reaction product which is obtained if an anhydrous N-methylolamide of the formula (1) 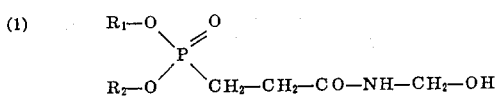

wherein $R_1$ and $R_2$ each denote an alkyl, halogenoalkyl or alkenyl radical with one to four carbon atoms, is condensed with itself in an anhydrous medium, optionally using an acid catalyst, in the presence of an inert organic solvent, at 70° to 180° C, the condensation being continued until about 0.7 to 1 mol of water has separated per 1 mol of N-methylol-amide employed, and optionally contains a curable aminoplast precondensate, and the material is thereafter dried and subjected to a treatment at elevated temperature.

In the formula (1), the radicals $R_1$ and $R_2$ can thus be identical, or different from one another. As a rule, $R_1$ and $R_2$ denote two identical radicals of the indicated composition. Chloroalkyl groups, such as 2-chloroethyl, or 2,3-dichlorophenyl groups, but preferably n-propyl, isopropyl, ethyl, methyl or allyl groups, may be mentioned as examples.

In the manufacture of the reaction products, N-methylolamides of the formula (2) 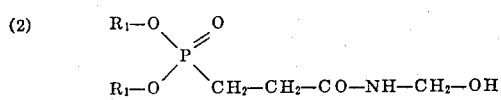

wherein $R_1$ has the indicated meaning, are accordingly used preferentially.

Particularly suitable reaction products are those which are manufactured from N-methylolamides of the formula

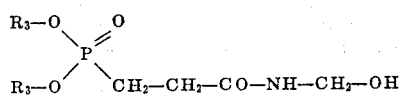

wherein $R_3$ denotes an ethyl or methyl radical, or above all of the formula

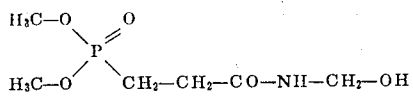

In the manufacture of the reaction products, an appropriate procedure is to manufacture the N-methylolamide of the formula (1) from the start in an anhydrous medium, that is to say to carry out the methylolation with the aid of paraformaldehyde. Preferably, a catalyst such as $NaOCH_3$ or MgO is also used conjointly. The methylolation preferably takes place at 80° to 120°C, especially at 95° to 105°C, and lasts 15 to 60 minutes, appropriately 25 to 30 minutes. If desired, methylolation can also be carried out in the presence of an inert solvent or suspending agent such as, for example, toluene, but preferably the reaction is carried out without solvents.

In the self-condensation of the N-methylolamides thus obtained, methods which are in themselves known are again used. An appropriate procedure is to condense at least one N-methylolamide of the formula (1), which must be in an anhydrous form, with itself, in an anhydrous medium, optionally using an acid catalyst, in the presence of an organic solvent, by warming up to the boiling point of the solvent in question. The reaction is continued until about 0.7 to 1, preferably about 0.9 to 1, or especially about 1, mol of water has separated in the water separator per 1 mol of N-methylolamide employed. Suitable organic solvents for the reaction are, for example, toluene, benzene or xylene. The condensation temperature is preferably 80° to 140°C. After completion of the reaction, at most 25 percent of the formaldehyde bonded as methylol groups in the starting product are still detectable in the reaction product, again as bonded formaldehyde. Practically the original amount of formaldehyde bonded as $-CH_2OH$ can be recovered by boiling in water or by splitting with phosphoric acid.

The reaction products to be used according to the invention are mixtures of self-condensation products of the compound of the formula (1) which as a rule contain not more than 15 structural elements of a compound of the formula (1) per molecule, and the individual polycondensed products can have a linear, branched or unbranched structure, or a cyclic structure. Because of the great complexity of the reaction product mixtures it is however not possible to determine the composition of the reaction products, or self-condensation products, to be used according to the invention accurately by means of the customary methods of investigation.

The pH value of the aqueous preparations containing the reaction products and which are to be used according to the invention for flameproofing cellulose-containing material, is advantageously less than five, and in particular less than three. In order to achieve this, strong mineral acids, such as sulphuric acid, nitric acid, hydrochloric acid or preferably orthophosphoric acid, are added to the preparation. Instead of the acids themselves, especially hydrochloric acid, it is also possible to use compounds from which the corresponding acids are easily, for example even without warming, formed in water by hydrolysis. As examples, phosphorus trichloride, phosphorus pentachloride, phosphorus oxychloride, thionyl chloride, sulphuryl chloride, cyanic chloride, acetyl chloride and chloroacetyl chloride may here be mentioned. These compounds on hydrolysis yield exclusively acid decomposition products, for example cyanuric acid and hydrochloric acid. Instead of using one of the strong acids, it can be advantageous to use the acid mixtures that correspond to the hydrolysis products of one of the compounds of which mention has just been made, that is to say, for example, instead of hydrochloric acid alone, to use a mixture corresponding to the phosphorus pentachloride of hydrochloric acid and ortho-phosphoric acid corresponding to the phosphorus pentachloride, appropriately in the molecular ratio 1:5.

The conjoint use of these acid catalysts may well be advantageous, but is not absolutely essential for achieving good flameproofing effects.

The preparations for flameproofing can also contain a latent acid catalyst for accelerating the curing of the aminoplast precondensate which may be present and for cross-linking the reaction products. Latent acid catalysts which can be used are the catalysts known for curing aminoplasts on cellulose-containing material, for example ammonium dihydrogen orthophosphate, magnesium chloride, zinc nitrate and above all ammonium chloride.

Apart from the reaction products and the additives required to adjust the pH value, and the curing catalysts, the preparations to be used according to the invention can contain yet further substances. An addition of aminoplast precondensates can be advantageous for achieving a good wash-resistant flameproof finish, but is not essential.

By aminoplast precondensates there are understood addition products of formaldehyde to nitrogen compounds which can be methylolated. 1,3,5-aminotriazines, such as N-substituted melamines, for example N-butylmelamine, N-trihalogenomethylmelamines, as well as ammeline, guanamines, for example benzoguanamines, acetoguanamine or diguanamines, may be mentioned. Further possibilities are: alkylureas or arylureas and alkylthioureas or arylthioureas, alkylene-ureas or alkylenediureas, for example ethyleneurea, propyleneurea, acetylenediurea or especially 4,5-dihydroxyimidazolidone-2 and derivatives thereof, for example 4,5-dihydroxyimidazolidone-2 substituted by the radical $-CH_2CH_2CO-NH-CH_2OH$ at the hydroxyl group in the 4-position. The methylol compounds of a urea, of an ethyleneurea or of melamine are preferentially used. Products which are as highly methylolated as possible in general yield particularly valuable products. Suitable aminoplast precondensates are both predominantly monomolecular aminoplasts and also more highly precondensed aminoplasts.

The ethers of these aminoplast precondensates can also be used together with the reaction products. The ethers of alkanols such as methanol, ethanol, n-propanol, isopropanol, n-butanol or pentanols are, for example, advantageous. It is however desirable that these aminoplast precondensates should be water-soluble, such as, for example, pentamethylolmelamine-dimethyl-ether.

It can also be advantageous if the preparations contain a copolymer, obtainable by polymerisation in aqueous emulsion, of (a) 0.25 to 10 percent of an alkaline earth salt of an $\alpha,\beta$-ethylenically unsaturated monocarboxylic acid, (b) 0.25 to 30 percent of a N-methylolamide or N-methylolamide-ether of an $\alpha,\beta$-ethylenically unsaturated monocarboxylic or dicarboxylic acid, and (c) 99.5 to 60 percent of at least one other copolymerisable compound. These copolymers, and their manufacture, are also known. The tear strength and abrasion resistance of the treated fibre material can be advantageously influenced by the conjoint use of such a copolymer.

A further additive to be mentioned which is advantageous in some cases is a softening dressing, for example an aqueous polyethylene emulsion or ethylene copolymer emulsion.

The preparations can furthermore also contain solubilising agents, such as organic solvents which are miscible with water, for example ethanol or methanol.

The content of reaction product in the aqueous preparations is appropriately so chosen that 15 to 40 percent is applied to the material to be treated. Here it is necessary to take into account that the commercially available textile materials of native or regenerated cellulose can absorb between 50 and 120 percent of an aqueous preparation. As a rule, the aqueous preparations contain 200 to 700 g/l, preferably 300 to 500 g/l, of the reaction product.

The amount of the additive which is required to adjust the hydrogen ion concentration to a value of less than five depends on the selected value itself and on the nature of the additive, but must in all circumstances be not less than a certain minimum. A certain excess over this minimum amount is in general to be recommended. Large excesses do not offer any advantages and can even prove harmful.

If additionally a polymer of the type indicated is added to the preparation, then this is advantageously done in small amounts, for example 1 to 10 percent, relative to the amount of the reaction product. The same is true of a plasticiser which may be added, where the appropriate amounts can again be 1 to 10 percent.

The preparations are now applied to the cellulose-containing fibre materials, especially textiles, for example linen, cotton, rayon, staple viscose or fibre mixtures of such materials with others, such as wool, polyamide or polyester fibres, and this application can be effected in a manner which is in itself known. Preferably, piece goods are used and are impregnated on a padder of the customary construction, which is fed with the preparation at room temperature.

The fibre material thus impregnated must now be dried, which is appropriately done at temperatures of up to 100°C. Thereafter it is subjected to a dry heat treatment at temperatures above 100°C, for example between 130° and 200°C, and preferably between 140° and 170°C. Generally speaking, the higher the temperature, the shorter the duration of the treatment. This heat treatment lasts, for example, from 2 to 6 minutes at temperatures of 140° to 170°C.

A rinse with an acid-binding agent, preferably with aqueous sodium carbonate solution, for example at between 40°C and the boil, and for 3 to 10 minutes, is advisable in the case of a strongly acid reaction medium.

As already indicated, the present process is capable of yielding flameproof finishes which are largely preserved even after repeated washing or dry cleaning, and which do not cause any unacceptable deterioration of the textile-mechanical properties of the treated material.

In the manufacturing instruction and example which follow, parts and percentages are parts by weight and percentages by weight. The relationship of parts by volume to parts by weight is as of ml to g.

MANUFACTURING INSTRUCTION I 181 parts (1 mol) of 3-(dimethylphosphono)-propionic acid amide, 30.75 parts of 97.8 percent strength paraformaldehyde and one part of $NaOCH_3$ (powder) are reacted in a stirred flask of 500 parts by volume capacity, equipped with a reflux condenser and thermometer, for 30 minutes at 100°C internal temperature. Thereafter, the mixture is cooled and the resulting, colourless syrup is filtered through a felt fabric. The reaction product contains 25 parts of total $CH_2O$ (determined by digestion with $H_3PO_4$), and 4.5 parts of free $CH_2O$ (determined by addition of KCN).

211 parts (1 mol) of this anhydrous 3-(dimethyl-phosphono)-propionic acid methylolamide are now mixed with 200 parts of toluene in an identical stirred flask and condensed at the reflux temperature of the toluene. After 3 hours, the reaction is complete and 18 parts (1 mol) of water have been obtained. The mixture is cooled to 60°C and diluted with 160 parts of methanol, and the resulting solution is freed of traces of impurities by filtration. Thereafter the toluene-methanol mixture in vacuo is removed at 60°C. A colourless, thick syrupy product is obtained, which still contains 2.4 parts of total formaldehyde. A sample of 2.5 parts of the reaction product is dissolved in 40 parts of water and heated to 100°C for 30 minutes. 22 parts of total formaldehyde (calculated relative to the total reaction product) are found.

MANUFACTURING INSTRUCTION II 264 parts of an 80 percent strength aqueous solution of 3-(dimethylphosphono)-propionic acid N-methylolamide, 1 part of p-toluenesulphonic acid monohydrate and 200 parts of benzene are brought to the boil, with rapid stirring, in a stirred flask of 500 parts by volume capacity which is provided with a water separator and thermometer. 61.5 parts of water are separated off azeotropically over the course of about 3½ hours. The benzene is thereafter replaced by toluene and the self-condensation is completed at the boiling point of the toluene. A total of 69 parts of water are thus obtained, and after deduction of the water contained in the starting product this amounts to 18 parts of water formed during the condensation. Thereafter, the toluene is largely removed, the reaction product is dissolved in 80 parts of methanol and the solution filtered, and the methanol and residual amount of toluene are then distilled off in vacuo at about 50°C.

166 parts of an opalescent, syrupy product are obtained, which still contains 3.8 parts of total formaldehyde. Of these, 2.3 parts are present as free formaldehyde.

MANUFACTURING INSTRUCTION III 284 parts of an 80 percent strength aqueous solution of 3-(diethyl-phosphono)-propionic acid N-methylolamide in 200 parts of toluene and 1 part of p-toluenesulphonic acid monohydrate are condensed, at the boiling point of the toluene, in a stirred flask of 500 parts by volume capacity, equipped with a water separator and thermometer. Altogether, 68 parts of water are obtained, which after deduction of the water contained in the starting product amounts to 11 parts of water formed during the condensation. After working up in accordance with manufacturing instruction II, 217 parts of reaction product are obtained.

MANUFACTURING INSTRUCTION IV 192.8 parts (0.83 mol) of diallylphosphonopropionic acid amide, 25.6 parts of 98 percent strength paraformaldehyde (0.83 mol) and 0.8 part of pulverulent sodium methoxide are treated for 30 minutes at 100°C internal temperature in a stirred flask of 500 parts by volume capacity, which is equipped with a water separator and thermometer. A melt of diallylphosphonopropionic acid N-methylolamide is obtained. Thereafter 200 parts of toluene and 0.8 part of p-toluenesulphonic acid are added and the self-condensation is carried out at the boiling point of the toluene. 11 parts of water are obtained. The highly viscous reaction product is finally diluted to about 65 percent solids content with water, for greater ease of manipulation.

EXAMPLE 1

A cotton fabric or a viscose rayon fabric is padded with one of the aqueous liquors A to D of Table I below. The liquor uptake is 80 and 86 percent respectively. The fabric is dried at 70° to 80°C and the product thereafter cured for 4½ minutes at 160°C. A part of the fabric is now further washed for 5 minutes in a solution containing 2 g of anhydrous sodium carbonate per litre of water, at the boil (cotton) or at 60°C (viscose rayon), and is rinsed and dried. A further part of this fabric is now boiled ten times for 30 minutes, or washed ten times for 30 minutes at 60°C, in a solution which contains 2 g of anhydrous sodium carbonate and 5 g of soap per litre of water (= 10 SNV-4 or SNV-3 washes).

The individual pieces of fabric are then tested for their flame resistance (vertical test according to DIN 53,906). The results of this test are also summarised in Table I below.

TABLE I

| Constituents | Untreated | Treated with preparation | | | |
|---|---|---|---|---|---|
| | | A | B | C | D |
| Product according to manufacturing instruction I, g./l. | | 500 | 500 | 450 | 280 |
| Pentamethylolmelamine-dimethyl-ether (60%), g./l. | | | | 80 | 80 |
| $H_3PO_4$ (85%), g./l. | | | 30 | 30 | 30 |
| pH value of the preparation | | 2.7 | 2.2 | 2.4 | 2.2 |
| Flame resistance: | | | | | |
| Cotton fabric: | | | | | |
| After re-washing: | | | | | |
| Burning time (sec.) | Burns | 0 | 0 | 0 | 0 |
| Tear length (cm.) | | 10.5 | 9.5 | 9 | 9 |
| Plus after 10 SNV-4 washes: | | | | | |
| Burning time (sec.) | Burns | 0 | 0 | 0 | 0 |
| Tear length (cm.) | | 9.5 | 9 | 9 | 9.5 |
| Viscose rayon fabric: | | | | | |
| After re-washing: | | | | | |
| Burning time (sec.) | Burns | | 0 | 0 | 0 |
| Tear length (cm.) | | | 12 | 9 | 10.5 |
| Plus after 10 SNV-3 washes: | | | | | |
| Burning time (sec.) | Burns | 0 | 0 | 0 | 0 |
| Tear length (cm.) | | 12 | 10.5 | 8.5 | 11.5 |

EXAMPLE 2

A cotton fabric or a viscose rayon fabric is padded with one of the aqueous liquors E to K of Table II below. The liquor uptake is 80 percent. The fabric is dried at 70° to 80°C and the product thereafter cured for 5 minutes at 145°C.

A part of the fabric is now re-washed for 5 minutes in a liquor which contains 4 g of anhydrous sodium carbonate per litre, at the boil (cotton) or at 60°C (viscose rayon), rinsed and dried. A further part of the fabric, for determining the degree of fixing, is not re-washed.

A further part of the cotton fabric is washed 5, 10 and 20 times for 45 minutes at the boil in a household washing machine. The wash liquor contains 5 g of a full strength detergent per litre (SNV 198,861).

The individual pieces of fabric are then tested for their flame resistance (vertical test according to DIN 53,906, ignition time 6 seconds).

The results of this test and the determinations of the degree of fixing are summarised in Table II below.
S.C. denotes solids content
P.C. denotes phosphorus content.

TABLE II

| Constituents | S.C. | P.C. | Untreated | E | F | G | H | J | K |
|---|---|---|---|---|---|---|---|---|---|
| Product according to manufacturing instruction, g./l.: | | | | | | | | | |
| II | 100 | 16.1 | | 290 | 220 | | | | |
| III | 100 | 14 | | | | 440 | 330 | | |
| IV | 64.7 | 8.2 | | | | | | 575 | 430 |
| Pentamethylolmelamine-dimethylether (60%), g./l. | | | | 80 | | 80 | 80 | 80 |
| $H_3PO_4$ (85%), g./l. | | | | 20 | 20 | 20 | 20 | 20 | 20 |
| P, g./l. | | | | 47 | 35 | 61.5 | 46.2 | 47 | 35 |
| Flame resistance: | | | | | | | | | |
| Cotton fabric: | | | | | | | | | |
| After re-washing: | | | | | | | | | |
| Burning time (seconds) | | | Burns | 0 | 0 | 0 | 0 | 0 | 0 |
| Tear length (cm.) | | | 11.5 | 9.5 | 12.5 | 11.5 | 11.5 | 10 |
| After 5 washes (SNV 198,861): | | | | | | | | | |
| Burning time (seconds) | | | Burns | 0 | 0 | 0 | 0 | 0 | 0 |
| Tear length (cm.)& | | | 11 | 10 | 12.5 | 11 | 11 | 9 |
| After 10 Washes: | | | | | | | | | |
| Burning time (seconds) | | | Burns | 0 | 0 | 0 | 0 | 0 | 0 |
| Tear length (cm.) | | | 13 | 12.5 | 12 | 12 | 9 | 13 |
| After 20 washes: | | | | | | | | | |
| Burning time (seconds) | | | Burns | 0 | 0 | | 0 | 0 | 0 |
| Tear length (cm.) | | | 10 | 9.5 | | 11.5 | 10 | 12 |
| Viscose rayon fabric: | | | | | | | | | |
| After re-washing | | | Burns | 0 | 0 | | | | |
| Burning time (seconds) | | | Burns | 0 | 0 | | | | |
| Tear length (cm.) | | | 11.5 | 10.5 | | | | | |
| Determination of degree of fixing, deposit in percent (relative to fibre weight): | | | | | | | | | |
| Cotton fabric: | | | | | | | | | |
| (a) not re-washed | | | | 22.8 | 20.1 | 34.1 | 348.2 | 27 | 24.1 |
| (b) re-washed | | | | 11 | 12 | 10 | 13.5 | 12.4 | 13.1 |
| Degree of fixing (percent) (relative to deposit) | | | | 48 | 60 | 29 | 45 | 46 | 54 |
| Viscose rayon: | | | | | | | | | |
| (a) not re-washed | | | | 22.4 | 20.2 | 33.5 | 27.5 | 26.1 | 23.1 |
| (b) re-washed | | | | 10.3 | 12 | 3.5 | 8.5 | 9.2 | 11.6 |
| Degree of fixing (percent) (relative to deposit) | | | | 46 | 59 | 10.5 | 31 | 35 | 50 |

We claim

1. Process for flameproofing cellulose-containing fibre material, which comprises treating this material with an aqueous preparation containing at least one reaction product which is obtained by self-condensation in an anhydrous medium of an anhydrous N-methylolamide of the formula

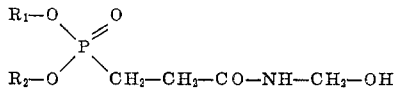

wherein $R_1$ and $R_2$ each denote an alkyl, halogenoalkyl or alkenyl radical with one to four carbon atoms, in the presence of an inert organic solvent, at 70° to 180°C, the condensation being continued until about 0.7 to 1 mol of water has separated per 1 mol of N-methylolamide employed, drying the treated material and subjecting the dried material to an elevated temperature.

2. Process according to claim 1, wherein the reaction product is a self-condensation product obtained in the presence of an acid catalyst.

3. Process according to claim 1, wherein the aqueous preparation contains additionally a curable aminoplast precondensate.

4. Process according to claim 1, wherein the elevated temperature is between 130° and 200°C.

5. Process according to claim 1, wherein the reaction product is a self-condensation product obtained by separating 0.9 to 1 mol of water per 1 mol of N-methylolamide.

6. Process according to claim 1, wherein the reaction product is a self-condensation product of a N-methylolamide of the formula (1) 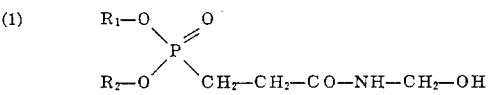

wherein $R_1$ and $R_2$ are the same.

7. Process according to claim 1, wherein the reaction product is a self-condensation product of a N-methylolamide of the formula

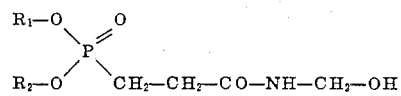

wherein $R_1$ and $R_2$ are the same and are ethyl or methyl radicals.

8. Process according to claim 1, wherein the reaction product is a self-condensation product of the N-methylolamide of the formula

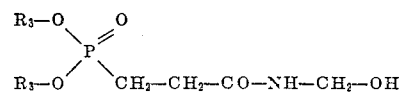

9. Process according to claim 1, wherein the reaction product is obtained by carrying out the condensation reaction at temperatures from 80° to 140°C.

* * * * *

Case 1-7073/E

UNITED STATES PATENT OFFICE
CERTIFICATE OF CORRECTION

Patent No. 3,754,981            Dated August 28, 1973

Inventor(s) HERMANN NACHBUR ET AL

It is certified that error appears in the above-identified patent and that said Letters Patent are hereby corrected as shown below:

Column 8, claim 8, lines 52 and 54, change "$R_3-$" to -- $H_3C-$ --.

Signed and sealed this 18th day of December 1973.

(SEAL)
Attest:

EDWARD M. FLETCHER, JR.       RENE D. TEGTMEYER
Attesting Officer                 Acting Commissioner of Patents